(12) United States Patent
Loermann et al.

(10) Patent No.: US 9,905,088 B2
(45) Date of Patent: Feb. 27, 2018

(54) RESPONSIVE VISUAL COMMUNICATION SYSTEM AND METHOD

(71) Applicant: BRAGI GmbH, München (DE)

(72) Inventors: Arne D. Loermann, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/244,894

(22) Filed: Aug. 23, 2016

(65) Prior Publication Data
US 2017/0061751 A1  Mar. 2, 2017

Related U.S. Application Data

(60) Provisional application No. 62/211,726, filed on Aug. 29, 2015.

(51) Int. Cl.
| | | |
|---|---|---|
| G08B 5/36 | (2006.01) | |
| H04M 1/05 | (2006.01) | |
| G06F 3/01 | (2006.01) | |
| H04M 1/725 | (2006.01) | |

(52) U.S. Cl.
CPC ............... G08B 5/36 (2013.01); H04M 1/05 (2013.01); *G06F 3/017* (2013.01); *H04M 1/7253* (2013.01)

(58) Field of Classification Search
CPC .................................. G08B 5/36; H04M 1/05
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

International Search Report and Written Opinion, PCT/EP2016/070228 (dated Jan. 9, 2017).

(Continued)

*Primary Examiner* — Leon Flores
(74) *Attorney, Agent, or Firm* — Goodhue, Coleman & Owens, P.C.

(57) ABSTRACT

A wearable device providing responsive visual feedback is provided. The wearable device includes a wearable device housing, at least one lighting element associated with the housing for providing, visual feedback, a processor disposed within the wearable device housing, the processor operatively connected to the at least one lighting element, a plurality of sensors operatively connected to the processor, wherein the processor is programmed to determine a mode of operation using sensed data from the plurality of sensor, and wherein the processor is programmed to control the at least one lighting element to convey visual feedback based on the mode of operation determined by the processor.

16 Claims, 6 Drawing Sheets

(56) References Cited

U.S. PATENT DOCUMENTS

| | | | |
|---|---|---|---|
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0212911 A1 | 9/2005 | Marvit et al. | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2008/0254780 A1 | 10/2008 | Kuhl et al. | |
| 2009/0303073 A1 | 12/2009 | Gilling et al. | |
| 2011/0018731 A1 | 1/2011 | Linsky et al. | |
| 2013/0154826 A1 | 6/2013 | Ratajczyk | |
| 2013/0293494 A1 | 11/2013 | Reshef | |
| 2015/0230022 A1* | 8/2015 | Sakai | H04R 1/1041 381/58 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

Announcing the $3,333,333 Stretch Goal (Feb. 24, 2014).

BRAGI is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready to Rumble, A Lot to be Done Over Christmas (Dec. 22, 2014).

BRAGI Update—Memories From April—Update on Progress (Sep. 16, 2014).

BRAGI Update—Memories from May—Update on Progress—Sweet (Oct. 13, 2014).

BRAGI Update—Memories From One Month Before Kickstarter—Update on Progress (Jul. 10, 2014).

BRAGI Update—Memories From the First Month of Kickstarter—Update on Progress (Aug. 1, 2014).

BRAGI Update—Memories From the Second Month of Kickstarter—Update on Progress (Aug. 22, 2014).

BRAGI Update—New People @BRAGI—Prototypes (Jun. 26, 2014).

BRAGI Update—Office Tour, Tour to China, Tour to CES (Dec. 11, 2014).

BRAGI Update—Status on Wireless, Bits and Pieces, Testing-Oh Yeah, Timeline(Apr. 24, 2015).

BRAGI Update—The App Preview, The Charger, The SDK, BRAGI Funding and Chinese New Year (Feb. 11, 2015).

BRAGI Update—What We Did Over Christmas, Las Vegas & CES (Jan. 19, 2014).

BRAGI Update—Years of Development, Moments of Utter Joy and Finishing What We Started(Jun. 5, 2015).

BRAGI Update—Alpha 5 and Back to China, Backer Day, On Track(May 16, 2015).

BRAGI Update—Beta2 Production and Factory Line(Aug. 20, 2015).

BRAGI Update—Certifications, Production, Ramping Up (Nov. 13, 2015).

(56) References Cited

OTHER PUBLICATIONS

BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy are we Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

RESPONSIVE VISUAL COMMUNICATION SYSTEM AND METHOD

PRIORITY STATEMENT

This application claims priority to U.S. Provisional Patent Application No. 62/211,726, filed Aug. 29, 2016, hereby incorporated by reference in its entirety.

FIELD OF THE INVENTION

The present invention relates to wearable devices. More particularly, but not exclusively, the present invention relates to wearable devices such as earpieces with improved user interfaces.

BACKGROUND

Wearable devices of various varieties are becoming increasingly popular consumer devices. Yet numerous problems exist which may preclude or delay widespread adoption of wearable devices. One of these problems relates to the user interface associated with wearable devices. Wearable devices may be able to perform multiple functions some of which may be complex in nature. Yet, it is desirable to have a user interface which is simple, intuitive, and elegant in design. Further complicating the design of wearable devices is that wearable devices may be exposed to different environments and use conditions than other types of consumer devices. Some of these environments and use conditions create additional problems if using conventional user interfaces.

For example, consider the use of buttons on such a device. Buttons have the disadvantage of requiring a protective membrane around them. This results in a decrease of their tactile feedback as well as complicating the design due to the limitations of the protective membrane. For example, with repeated exposure to caustic or corrosive compounds such as sweat or cerumen, such membranes are well known to become brittle and crack over time, allowing for water contamination of the delicate microelectronic components contained within. Thus, various problems remain with wearable devices, including earpieces.

SUMMARY

Therefore, it is a primary object, feature, or advantage of the present invention to improve over the state of the art.

It is a further object, feature, or advantage of the present invention to provide a wearable device such as an earpiece or set of earpieces which supports multiple modalities.

It is a still further object, feature, or advantage of the present invention to provide a wearable device such as an earpiece or set of earpieces which are water resistant so they may be used in various environments including by a user swimming in a body of water.

Another object, feature, or advantage of the present invention is to provide a wearable device that is not easily damaged by the environments in which it is exposed.

Another object, feature, or advantage of the present invention is to provide for the use of colorimetric light to give visual data and/or feedback to a user.

Yet another object, feature, or advantage of the present invention is to provide a wearable device which provides visual feedback to a user including over operational controls of the device.

Another object, feature of advantage of the present invention is to provide a wearable which allows for activation of optional features, the confirmation of gestural movements, and/or the assessment of embedded device data.

It is a further object, feature, or advantage of the present invention to provide a software application such as a mobile app operating on a mobile device which is programmed to acquire imagery of visual, data from a wearable device and interpret the visual data to extract encoded data.

One or more of these and/or other objects, features, or advantages will become apparent from the specification and claims that follow. No single embodiment need provide each and every object, feature or advantage. It is contemplated that different embodiments may have different objects, features, or advantages.

According to one aspect, a wearable device providing responsive visual feedback is provided. The wearable device includes a wearable device housing, at least one lighting element associated with the housing for providing visual feedback, a processor disposed within the wearable device housing, the processor operatively connected to the at least one lighting element, a plurality of sensors operatively connected to the processor, wherein the processor is programmed to determine a mode of operation using sensed data from the plurality of sensor, and wherein the processor is programmed to control the at least one lighting element to convey visual feedback based on the mode of operation determined by the processor.

According to another aspect, a system includes: a wearable device providing responsive visual feedback comprising: a wearable device housing; at least one lighting element associated with the housing for providing visual feedback; a processor disposed within the wearable device housing, the processor operatively connected to the at least one lighting element; a plurality of sensors operatively connected to the processor; wherein the processor is programmed to control the at least one lighting element to encode data. The system further includes a software application executing on a computing device wherein the software application is programmed to acquire imagery of the visual feedback and recover the data.

According, to another aspect, a system includes a first wearable device and a second wearable device wherein each of the first wearable device and the second wearable device comprises a wearable device housing, at least one lighting element associated with the housing for providing visual feedback, a processor disposed within the wearable device housing, the processor operatively connected to the at least one lighting element, a plurality of sensors operatively connected to the processor, and wherein the processor is programmed to determine a mode of operation using sensed data from the plurality of sensors, wherein the processor is programmed to control the at least one lighting element to convey visual feedback based on the mode of operation determined by the processor; and wherein the first wearable device and the second wearable device are configured to work in concert to convey visual feedback.

According to another aspect, a method of providing responsive visual feedback from a wearable device includes determining, by a processor a mode of operation for the wearable device using sensed data from a plurality of sensors of the wearable device and controlling at least one lighting, element of the wearable device based on the mode of operation of the wearable device determined by the processor.

According to another aspect, a method of providing responsive visual feedback from a wearable device includes providing a wearable device comprising (a) a wearable device housing, (b) at least one lighting element associated with the housing for providing visual feedback, (c) a processor disposed within the wearable device housing, the processor operatively connected to the at least one lighting element, and (d) a plurality of sensors operatively connected to the processor. The method further includes determining by the processor a mode of operation for the wearable device using sensed data from the plurality of sensors of the wearable device and controlling at least one lighting element of the wearable device based on the mode of operation of the wearable device determined by the processor.

DETAILED DESCRIPTION

According to one aspect a new earpiece for use in multiple modalities is provided. The device may provide multiple functions including functions of interest to a user performing sports activities, the transmission of audio information for two way conversations, and the measurement of numerous biometric data sets. Of course, the earpiece may also perform additional functions.

Although such a device preferably performs a number of different functions, it is preferred that the wearable device be relatively simple and/or intuitive in operation. In addition, because the device may be used during sports activities it is preferred that the device be water resistant or otherwise adapted for harsh environments. Where the device is water resistant, it is preferred that the device allows the user to interact with it when in the water such as while swimming in a swimming pool, lake, or ocean.

The present invention provides for a new system and method for communication with the user as well as facilitation of device analytics. In particular, colorimetric light is used to give visual data and/or feedback to the user. The device may provide the user feedback over operational controls of the device, activate optional features, confirm gestural movements, allow for assessment of embedded device data such as device build, serial number, build date, etc, as well as to provide for an alternative method for software upload, download and analysis of data. The lights may also be used for other functions such as may be used for diagnostic purposes or to assist developers including for use in debugging.

Figure 1:
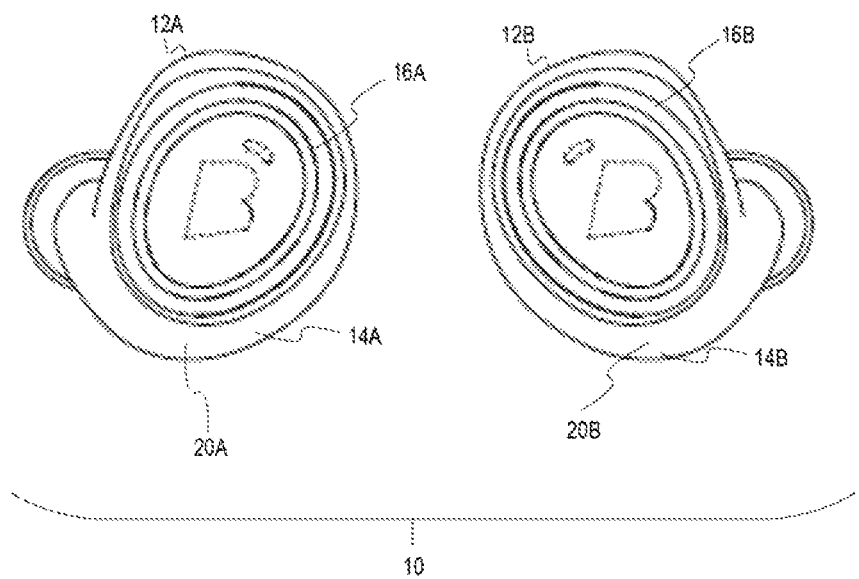
FIG. 1 is a perspective view of one embodiment of a wearable device.

FIG. 1 illustrates one example of a wearable device in the form of a set of earpieces 10 including a left ear piece 12A and a right earpiece 12B. Each of the ear pieces 12A, 12B has a housing 14A, 14B which may be in the form of a protective shell or casing. A light display area 16A, 16B is present on each of the ear pieces 12A, 12B. The light display areas 16A, 16B each provide for producing light of one or more colors. Lighting elements such as LEDS may be used as light sources to generate the light and light guides or other optics may be used to transmit the light from the light source to the display areas 16A, 16B.

Different colors of light may be used to visually indicate different information to uses. For example a visual display of red may be used to indicate that the battery is at a critically low level and needs to be recharged soon. If the battery is at a recommended charge level a visual display of yellow may be used. If the battery is at a stable level a visual display of green may be used. It is to be understood that battery level is merely one mode of operation of the device. The same lighting may be used to provide visual feedback regarding other functionality or modes of operation of the device.

In another mode of operation, the visual indicators may relate to charging of the battery using its case or other power source. For example, when the device is properly coupled to its charging case or other power source an LED (or plurality of LEDs) may show green (or another color). The LED may glow as charging initiates. If the device is not properly coupled to its charging case or seated poorly in the case then an LED (or a plurality of LEDs) may show red (or another color).

The device may be multi-modal so that based on the context of use the same visual indicators may take on different meanings. Thus, in the above examples, the visual display of red may indicate that the battery is at a critically low level and it may also indicate that the device is not properly coupled to its charging case. Thus, the same visual displays may have different meanings depending upon the mode of operation of the device.

Another mode of operation of the device relate to gestural movements. For example, where a user performs a gestural movement which is interpreted by the device the device may light or activate one or more lighting elements to confirm the gestural movement or to indicate that the gestural movement could not be interpreted.

Other modes of operation may include those associated with providing visual data, providing visual feedback, activating optional features, or other types of operations that may be desirable or appropriate for a particular device.

It is contemplated that where LEDs are used as light sources that a multi-color LED may be used such as a bicolor LED, tricolor LED or other type of LED. It is further contemplated that an array of different colored LEDs may be used. It is further contemplated that light from one or more LEDs may be communicated through a light pipe or light guide to provide a more aesthetically pleasing display to a user.

In addition to the particular colors of LEDs used, information may be communicated in other manners as well. This includes the number of LEDs or the sequencing of LEDs being lit, the duration that a LED is lit, or frequency of pulsations of light.

Figure 2:
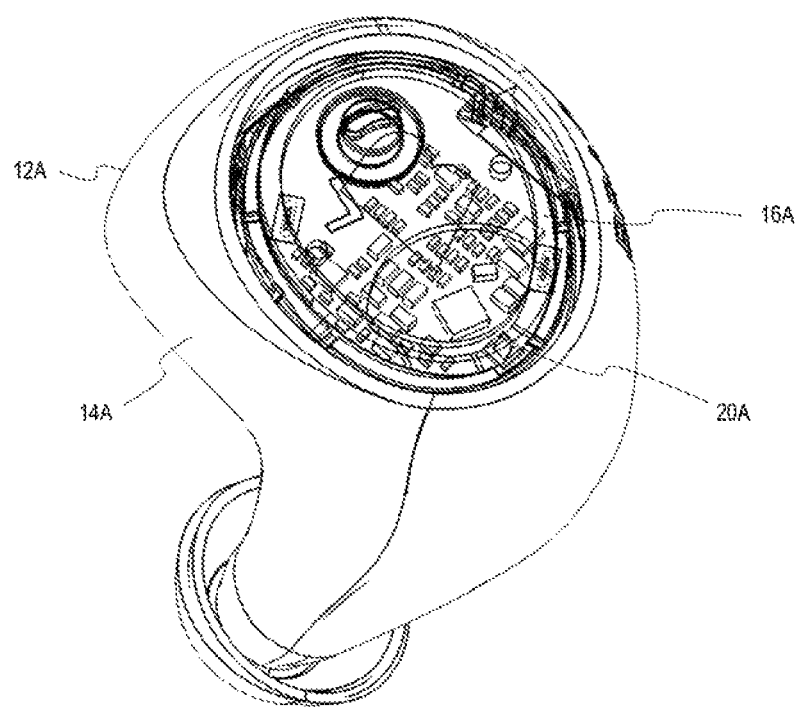
FIG. 2 is perspective view of the wearable devices from an opposite side.

FIG. 2 illustrates another view of a set of earpieces. Each of the earpieces shown includes two LEDs 20A, 22A for the first earpiece 12A and two LEDs 20B, 22B for the second earpiece 12B. More or fewer LEDs may be used.

Figure 3:
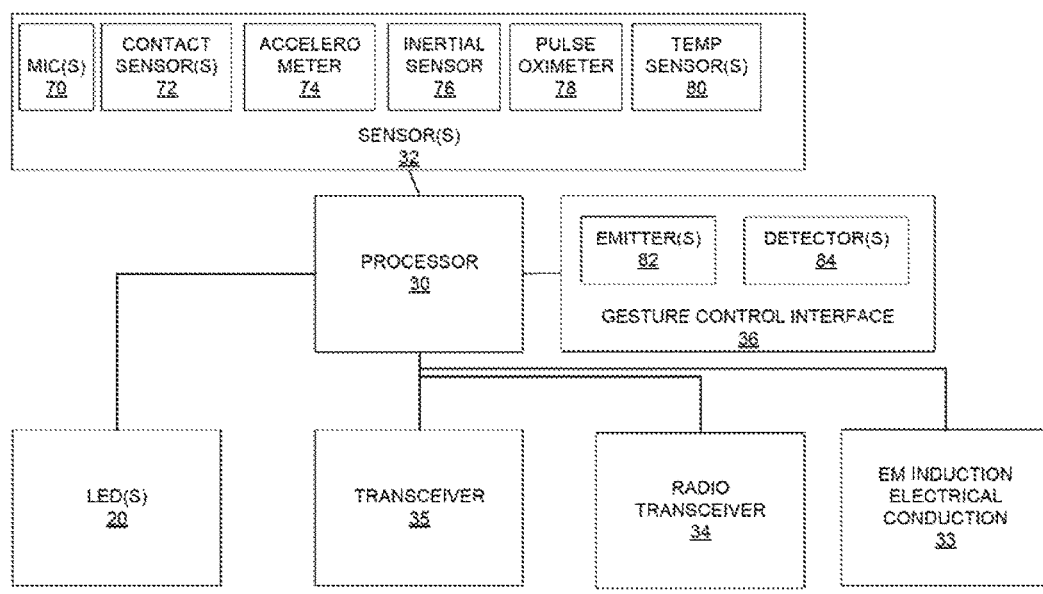
FIG. 3 is a block diagram illustrating one example of circuitry of a wearable device.

FIG. 3 is a block diagram illustrating a device. The device may include one or more LEDs electrically connected to a processor 30. The processor 30 may also be electrically connected to one or more sensors 32 and a transceiver 34 such as a short range transceiver using Bluetooth, UWB, magnetic induction, or other means of communication. In operation, the processor 30 may be programmed to convey different information using one or more of the LED(s) 20 based on context or mode of operation of the device. One way in which the processor 30 may determine the relevant mode of operation of the device is from data collected from one or more of the sensor(s) 32. For example, where the device is an earpiece, the sensor(s) may include an inertial sensor, one or more contact sensors, a bone conduction sensor, one or more microphones, a pulse oximeter, or other biological sensors. Thus, based on the status of different sensors, additional information about the mode of operation can be determined. Thus, for example, the processor may determine whether or not the earpiece is positioned on the ear in a proper position, whether or not the earpiece is being charged, or other contextual information.

Figure 4:
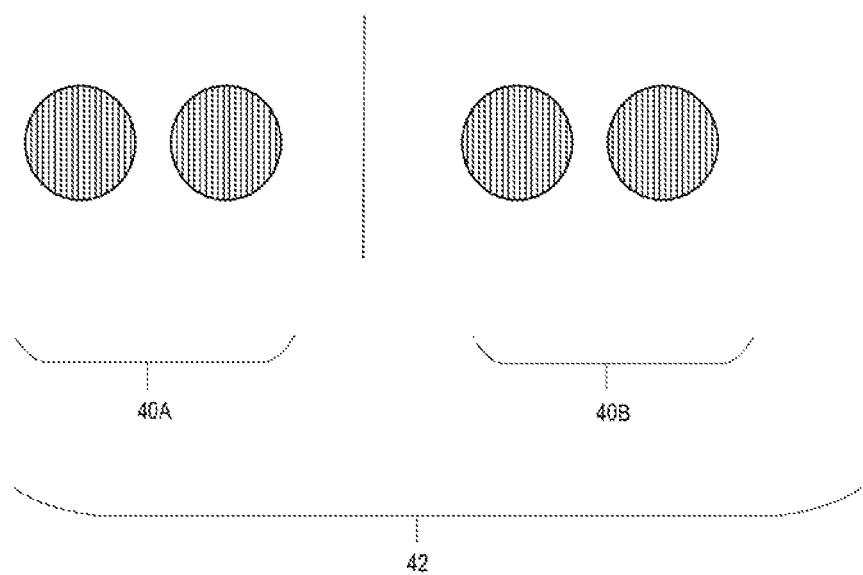
FIG. 4 illustrates an example of LEDs of different devices.

FIG. 4 illustrates an example of LEDs of different devices. In this example, note there are multiple wearable devices each with one or more LEDs. As shown in FIG. 4 this includes a set of LEDs 40A associated with a left earpiece and a set of LEDs 40B associated with a right ear piece. Thus. LEDs from multiple devices may be used in concert or in combination to convey information.

Figure 5:
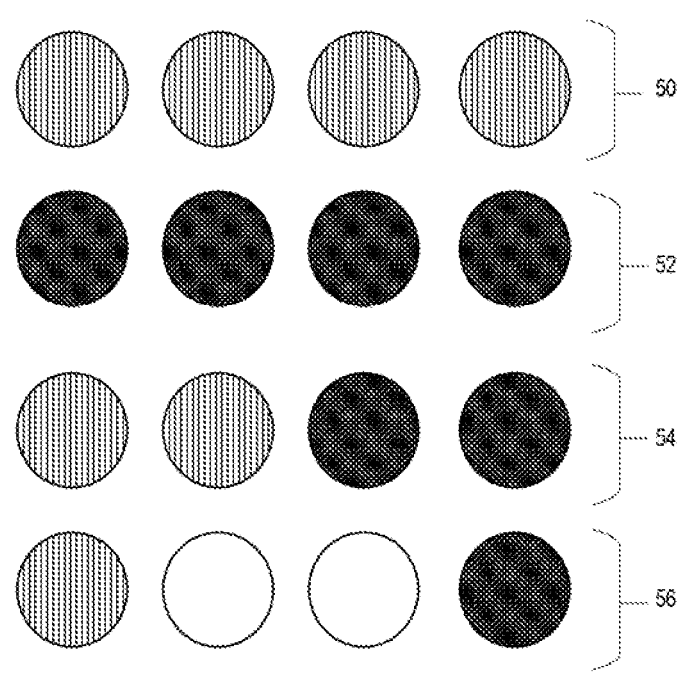
FIG. 5 illustrates further examples of communicating using LED devices.

FIG. 5 illustrates further examples of communicating using LED devices. A first configuration of LEDs 50 shows four LEDs of a first color. A second configuration of LEDs 52 shows four LEDs of a second color. A third configuration of LEDs 54 shows two LEDs of a first color and two LEDs of a second color. A fourth configuration of LEDs 56 shows one LED of a first color, two LEDs of a second color and a third LED of a third color. The four LEDs shown may be on the same ear piece or device or may be split between multiple ear pieces and devices.

Figure 6:
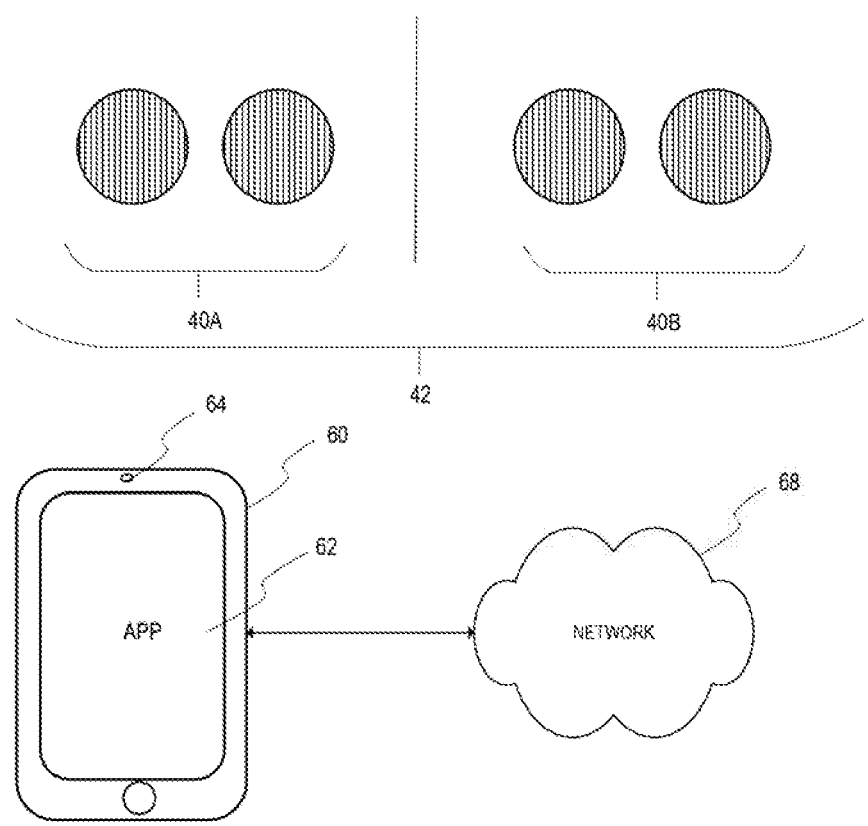
FIG. 6 illustrates an app on a mobile device programmed to visually interpret patterns displayed using LEDs.

FIG. 6 illustrates an app on a mobile device programmed to visually interpret colors or patterns displayed using LEDs. A first set of LEDs 40A are associated with a first device and a second set of LEDs 40B are associated with a second device. Each of the devices may be an earpiece within a set 42 of earpieces. A mobile device 60 is also shown with a camera 64. An app 62 may be stored on a non-transitory machine readable medium of the mobile device 60 and executed on a processor of the mobile device 60. As previously explained visual indicators such as LEDs or other lighting elements may provide feedback directly to users based on mode of operation or context. It is also contemplated that the visual indicators may be used to convey information to an app or other software application. The app 62 may access a camera 64 of the mobile device 60 to acquire imagery of the visual indicators. Any type of digital data may be conveyed by turning on and off the LEDs or other lighting elements. The digital data may be encoded in any number of different ways and any number of types of information may be represented.

One use of the app 62 is to interpret trace data sent from one or more device. Another use of the app 62 is to interpret visual flashes used to convey information about debugging protocols. Another use of the app 62 is to allow for identification of user stored databases. One of the advantages of conveying information in this manner is that it does not require the use of a serial port. This may be an important advantage when the earpieces are water tight and may be used while swimming. Nor does it require the use of a Bluetooth transmitter and receiver or other short range transceiver. The information conveyed can also include embedded device data such as device build, serial number, build date, etc. as well as to provide for an alternative method for software upload, download and analysis of data. Thus, any number of different types of data may be conveyed from a wearable device using one or more LEDs.

Therefore methods, devices, and systems which provide responsive visual feedback have been shown and described. Although specific examples have been set forth herein, numerous options, variations, and alternatives are contemplated. This includes variations in the type of device, the number of devices, the type of lighting elements, the number of lighting elements, the placement of lighting elements, the colors or lighting elements, whether or not light pipes are used, and other variations.

What is claimed is:

1. A wearable device providing responsive visual feedback comprising:
    a wearable device housing;
    at least one lighting element associated with the wearable device housing for providing the visual feedback;
    a processor disposed within the wearable device housing, the processor operatively connected to the at least one lighting element; and
    a plurality of sensors operatively connected to the processor;
    wherein the plurality of sensors includes a biological sensor, a bone conduction sensor, a contact sensor, and a motion sensor;
    wherein the processor is programmed to determine a mode of operation and additional information regarding a context of the mode of operation using sensed data from the plurality of sensors; and
    wherein the processor is programmed to control the at least one lighting element to convey the visual feedback based on the mode of operation and the additional information regarding the context of the mode of operation determined by the processor.

2. The wearable device of claim 1 wherein the wearable device is an earpiece and wherein the housing is an ear piece housing.

3. The wearable device of claim 1 wherein each of the at least one lighting element comprises a light emitting diode (LED).

4. The wearable device of claim 1 wherein the mode of operation is associated with gestural movements.

5. The wearable device of claim 1 wherein the mode of operation is associated with battery level.

6. The wearable device of claim 1 wherein the mode of operation is associated with charging.

7. The wearable device of claim 1 wherein the mode of operation is a diagnostic mode.

8. A system comprising the wearable device of claim 1 and a software application executing on a computing device wherein the software application is programmed to acquire imagery of the visual feedback and recover the data.

9. The system of claim 8 wherein the computing device is a mobile device.

10. A system comprising:
    a first wearable device and a second wearable device wherein the first wearable device and the second wearable device each comprise a wearable device housing, at least one lighting element associated with the wearable device housing, a processor disposed within the wearable device housing and operatively connected to the at least one lighting element, and a plurality of sensors operatively connected to the processor; and
    a mobile device comprising a camera configured to acquire images of the first wearable device and the second wearable device;
    wherein the processor of the first wearable device is programmed to determine a mode of operation of the first wearable device using sensed data from the plurality of sensors of the first wearable device and instruct the at least one light element of the first wearable device illuminate based on the mode of operation of the first wearable device determined by the processor of the first wearable device;

wherein the processor of the second wearable device programmed to determine a mode of operation of the second wearable device using sensed data from the plurality of sensors of the second wearable device and instruct the at least one lighting element of the second wearable device to illuminate based on the mode of operation of the second wearable device determined by the processor of the second wearable device; and wherein an app on the mobile device interprets the illumination of the first wearable device and the illumination of the second wearable device from images acquired by the camera to determine the mode of operation of the first wearable device and the mode of operation of the second wearable device.

11. The system of claim 10 wherein the first wearable device is a first ear piece.

12. The system of claim 11 wherein the second wearable device is a second ear piece.

13. The system of claim 10 wherein the app determines the mode of operation of the first wearable device and the mode of operation of the second wearable device to be related to trace data.

14. The system of claim 10 wherein the app determines the mode of operation of the first wearable device and the mode of operation of the second wearable device to be related to debugging protocols.

15. A method of providing responsive visual feedback from a wearable device comprising:

providing a wearable device comprising (a) a wearable device housing, (b) at least one lighting element associated with the housing for providing visual feedback, (c) a processor disposed within the wearable device housing, the processor operatively connected to the at least one lighting element, and (d) a plurality of sensors operatively connected to the processor, wherein the plurality of sensors includes a biological sensor, a bone conduction sensor, a contact sensor, and a motion sensor;

determining, by the processor, a mode of operation and additional information regarding a context of the mode of operation for the wearable device using sensed data from the plurality of sensors of the wearable device; and controlling the at least one lighting element of the wearable device based on both the mode of operation and the additional information regarding the context of the mode of operation of the wearable device determined by the processor.

16. The method of claim 15 wherein the wearable device is an earpiece.

* * * * *